United States Patent
Inagaki et al.

(10) Patent No.: US 9,540,001 B2
(45) Date of Patent: Jan. 10, 2017

(54) PARKING ASSISTANCE DEVICE

(71) Applicants: AISIN SEIKI KABUSHIKI KAISHA, Kariya-shi (JP); HONDA MOTOR CO., LTD., Minato-ku (JP)

(72) Inventors: Hiroki Inagaki, Kariya (JP); Yoshihito Mizuno, Nagoya (JP); Masahiro Ishihara, Nagoya (JP); Katsuhiro Sakai, Wako (JP)

(73) Assignees: AISIN SEIKI KABUSHIKI KAISHA, Kariya-Shi, Aichi (JP); HONDA MOTOR CO., LTD, Minato-Ku, Tokyo (JP)

( * ) Notice: Subject to any disclaimer, the term of this patent is extended or adjusted under 35 U.S.C. 154(b) by 0 days.

(21) Appl. No.: 14/502,412

(22) Filed: Sep. 30, 2014

(65) Prior Publication Data

US 2015/0100193 A1    Apr. 9, 2015

(30) Foreign Application Priority Data

Oct. 4, 2013  (JP) .................................. 2013-209670

(51) Int. Cl.
*B60W 30/06*    (2006.01)
*B62D 15/02*    (2006.01)

(52) U.S. Cl.
CPC ............ *B60W 30/06* (2013.01); *B62D 15/028* (2013.01); *B62D 15/0285* (2013.01)

(58) Field of Classification Search
CPC ............... B60W 30/06; B62D 15/028; B62D 15/0285; G01C 21/26
See application file for complete search history.

(56) References Cited

U.S. PATENT DOCUMENTS

| | | | |
|---|---|---|---|
| 2009/0123028 A1* | 5/2009 | Satonaka | B62D 15/0285 382/103 |
| 2010/0235053 A1 | 9/2010 | Iwakiri et al. | |
| 2011/0144865 A1* | 6/2011 | Niemz | B62D 5/0469 701/42 |

FOREIGN PATENT DOCUMENTS

| | | |
|---|---|---|
| JP | 2008-143430 A | 6/2006 |
| JP | 2010-269707 A | 12/2010 |

OTHER PUBLICATIONS

Office Action issued on Sep. 1, 2015, by the Japanese Patent Office in corresponding Japanese Patent application No. 2013-209670. (4 pages).

* cited by examiner

*Primary Examiner* — Basil T Jos
(74) *Attorney, Agent, or Firm* — Buchanan Ingersoll & Rooney PC

(57) ABSTRACT

A parking assistance device includes: a route information storage unit storing in advance route information indicating a travel route at the time of parking, the route information being stored according to the forward start position; an inclination calculation unit configured to calculate a current inclination of a vehicle length direction of the vehicle with respect to the target parking position; an offset amount setting unit configured to set an offset amount in the interval direction of the forward route between the current vehicle position and the position at which the vehicle length direction is parallel with the forward route; and a guiding unit configured to guide the vehicle to the target parking position based on a travel route adjacent to the position at which the vehicle length direction is parallel with the forward route.

13 Claims, 4 Drawing Sheets

| Inclination (angle θ) | −θ1 | −θ2 | −θ3 | −θ4 | −θ5 | 0 | θ5 | θ4 | θ3 | θ2 | θ1 |
|---|---|---|---|---|---|---|---|---|---|---|---|
| Offset amount (deviation T) | a | b | c | d | e | f | g | h | i | j | k |

PARKING ASSISTANCE DEVICE

CROSS REFERENCE TO RELATED APPLICATIONS

This application is based on and claims priority under 35 U.S.C. Section 119 to Japanese Patent Application No. 2013-209670 filed on Oct. 4, 2013, the entire content of which is incorporated herein by reference.

TECHNICAL FIELD

This disclosure relates to a parking assistance device configured to set a travel route to a target parking position according to the inclination of a vehicle with respect to the target parking position.

BACKGROUND DISCUSSION

Conventionally, parking assistance devices that assist a parking operation of a driver performing parking of a vehicle have been used. JP 2010-269707A discloses an example of this type of technique.

With the driving assistance system for a vehicle disclosed in JP 2010-269707A, when the vehicle is stopped for parking, multiple parking route candidates are read out from a parking route table based on the width of the parking space and width of the road facing the parking space. Then, one of the candidates is selected according to the position at which the vehicle is stopped, and the vehicle steering is driven such that the vehicle is maneuvered in accordance with the selected parking route.

SUMMARY

According to the technique disclosed in JP 2010-269707A, the position at which the vehicle is stopped for parking is an initial position, and a parking route from the initial position to the parking space is selected. Accordingly, for example, if the vehicle in the initial position is not in a state of being parallel with respect to the parking space, the vehicle travels so as to enter a state of being parallel with respect to the parking space in a frontward position reached by moving parallel from the initial position along the parking space. Accordingly, depending on the inclination of the vehicle at the initial position with respect to the parking space, there is a possibility that the vehicle will travel a significantly meandering route in the initial period of traveling from the initial position. Such an operation causes a feeling of discomfort for the driver of the vehicle.

In view of the above-mentioned problems, this disclosure provides a parking assistance device according to which a driver does not have a feeling of discomfort when parking a vehicle.

A characteristic configuration of the parking assistance device includes: a route information storage unit storing in advance a plurality of pieces of route information indicating a travel route composed of a forward route for traveling forward from a forward start position to a reverse start position and a reverse route for traveling in reverse from the reverse start position to a target parking position when parking of a vehicle in the target parking position is to be performed while a steering angle operation is performed, the plurality of pieces of route information being stored according to the forward start position; a vehicle position information acquisition unit configured to acquire vehicle position information indicating a current position of the vehicle that has stopped with respect to the target parking position when the parking is to be performed; an inclination calculation unit configured to calculate a current inclination of the vehicle in the vehicle length direction with respect to the target parking position based on the vehicle position information; an offset amount setting unit configured to, in the case where a plurality of forward routes are provided at a predetermined interval and the vehicle is to be caused to travel forward from the current position at a predetermined steering angle, set an offset amount in the interval direction of the forward route between the current position of the vehicle and a position at which the vehicle length direction of the vehicle is parallel with the forward route, based on the inclination; a route information selection unit configured to, among the plurality of pieces of route information stored in the route information storage unit, select a piece of route information indicating a travel route adjacent to the position at which the vehicle length direction is parallel with the forward route; and a guiding unit configured to guide the vehicle to the target parking position based on the selected route information.

DETAILED DESCRIPTION

Figure 1:
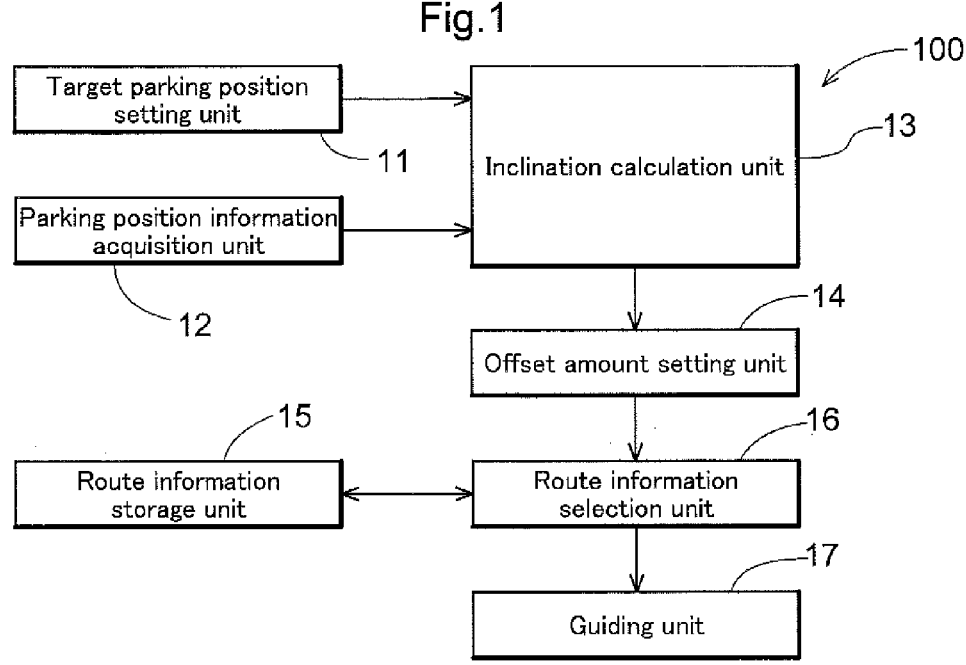
FIG. 1 is a schematic block diagram showing a configuration of a parking assistance device.

A parking assistance device according to this disclosure is configured to include a function of setting a travel route from a stop position to a target parking position according to an inclination of a vehicle stopped at a forward start position and according to the relative position of the target parking position so that the vehicle is parked in the target parking position. A parking assistance device 100 according to the present embodiment will be described in detail hereinafter.

A characteristic configuration of the parking assistance device according to this disclosure includes: a route information storage unit storing in advance a plurality of pieces of route information indicating a travel route composed of a forward route for traveling forward from a forward start position to a reverse start position and a reverse route for traveling in reverse from the reverse start position to a target parking position when parking of a vehicle in the target parking position is to be performed while a steering angle operation is performed, the plurality of pieces of route information being stored according to the forward start position; a vehicle position information acquisition unit configured to acquire vehicle position information indicating a current position of the vehicle that has stopped with respect to the target parking position when the parking is to be performed; an inclination calculation unit configured to calculate a current inclination of the vehicle in the vehicle length direction with respect to the target parking position based on the vehicle position information; an offset amount setting unit configured to, in the case where a plurality of forward routes are provided at a predetermined interval and the vehicle is to be caused to travel forward from the current position at a predetermined steering angle, set an offset amount in the interval direction of the forward route between the current position of the vehicle and a position at which the vehicle length direction of the vehicle is parallel with the forward route, based on the inclination; a route information selection unit configured to, among the plurality of pieces of route information stored in the route information storage unit, select a piece of route information indicating a travel route adjacent to the position at which the vehicle length direction is parallel with the forward route; and a guiding unit configured to guide the vehicle to the target parking position based on the selected route information.

According to this configuration, it is possible to cause forward traveling on a smooth travel route from the position of the vehicle that has been stopped with respect to the target parking position to a reverse start position. Also, it is sufficient to travel in reverse from the reverse start position to the target parking position in accordance with a reverse route that is stored in advance. Accordingly, since it is possible to cause the vehicle to travel in a smooth manner, it is possible to prevent the driver from feeling discomfort when parking the vehicle.

Also, it is preferable that the offset amount setting unit sets the offset amount based on a map in which the relationship between the inclination of the vehicle and the offset amount is defined in advance.

According to this configuration, the position at which the vehicle length direction of the vehicle will be parallel with the forward route in the case of traveling from a position of a vehicle that is stopped with respect to a target parking position with a predetermined steering angle can be obtained easily. Accordingly, it is possible to reduce the amount of calculation processing.

Also, it is preferable that, from among pieces of route information indicating travel routes adjacent to the position at which the vehicle length direction is parallel with the forward route, the route information selection unit selects a piece of route information indicating a travel route that is closer in the interval direction to the position at which the vehicle length direction is parallel with the forward route.

With this configuration, the travel distance for the vehicle from the position at which the vehicle length direction is parallel with the forward route until reaching one of the travel routes stored in advance can be shortened. Accordingly, the target parking position can be reached swiftly.

Also, it is preferable that, from among pieces of route information indicating travel routes adjacent to the position at which the vehicle length direction is parallel with the forward route, the route information selection unit selects a piece of route information indicating a travel route that is farther away in the interval direction from the target parking position.

With this kind of configuration, the vehicle travels on the travel route farther away from the target parking position in the interval direction of the forward route, and therefore it is possible to prevent coming into contact with an object (e.g., other vehicles parked in front of and behind the target parking position) in the vicinity of the target parking position and it is possible to prevent overshooting with respect to the travel route when the vehicle is moving toward the selected travel route.

Also, it is preferable that, if there is one piece of route information indicating a travel route adjacent to the position at which the vehicle length direction is parallel with the forward route, the route information selection unit selects the piece of route information.

According to this configuration, even if there is only one travel route adjacent to the position at which the vehicle length direction is parallel with the forward route, it is possible to guide the vehicle to the target parking position.

FIG. 1 is a schematic block diagram showing a configuration of a parking assistance device 100 according to the present embodiment. As shown in FIG. 1, the parking assistance device 100 is configured to include functional units, namely a target parking position setting unit 11, a vehicle position information acquisition unit 12, an inclination calculation unit 13, an offset amount setting unit 14, a route information storage unit 15, a route information selection unit 16, and a guiding unit 17. The functional units use a CPU as a core member, and the above-mentioned functional units are configured to perform various types of processing for assistance in the case where a driver is to park a vehicle 1 in a target parking position P, and are configured by hardware, software, or both. In the present embodiment, the parking assistance device 100 is included in a vehicle 1.

Figure 2:
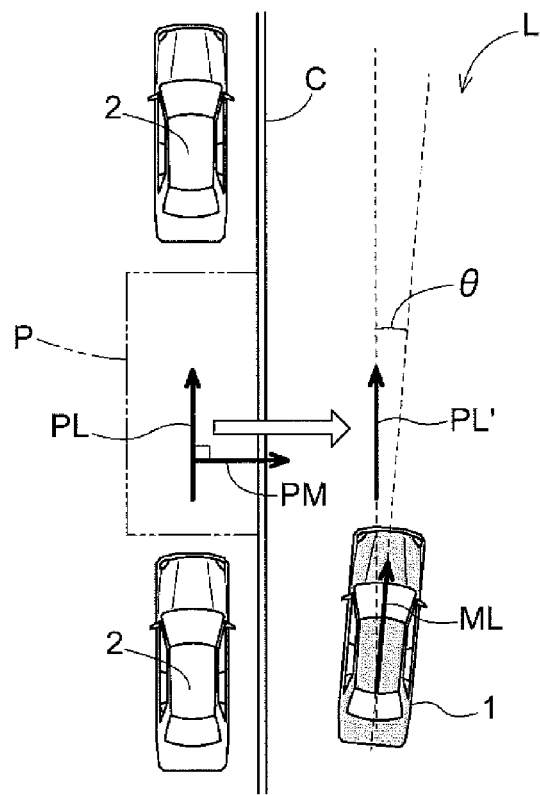
FIG. 2 is a diagram showing an inclination of a vehicle with respect to a target parking position.

The target parking position setting unit 11 sets a target parking position P, which is a parking space in which a vehicle 1 as shown in FIG. 2 is to be parked. In the present embodiment, a description will be given using parallel parking as an example of parking. Parallel parking is parking the vehicle 1 such that a vehicle length direction ML of the vehicle 1 is parallel with respect to a ground object C such as a curbstone, a white line, or the like on a road L. The vehicle length direction ML of the vehicle 1 is the direction of a line virtually connecting a front center portion and a rear center portion in a view from above of the vehicle 1. In the present embodiment, a description will be given using an example of a case in which the vehicle 1 is parallel parked in a space interposed between other vehicles 2 on the left side of the road L as shown in FIG. 2. Here, the target parking position P is a candidate target parking position P that is set temporarily until the parking assistance device 100 actually determines the target parking position P for calculating the travel route R (see FIG. 3). For this reason, if the driver does not like this target parking position P, the target parking position P can be set to another parking space.

In the present embodiment, setting of the target parking position P can be performed by performing image recognition of a captured image of the periphery of the vehicle 1 acquired by a camera included in the vehicle 1, for example. Also, the captured image of the periphery of the vehicle 1 can be displayed on a touch panel provided in the vehicle and the user can set the target parking position P by operating the touch panel. Furthermore, the target parking position P can also be set using an ultrasonic sonar, a distance imaging sensor, or the like.

Returning to FIG. 1, the target parking position setting unit 11 acquires coordinates that define the thus-set target parking position P. It is preferable that the coordinates that define the target parking position P are coordinates in a coordinate system used in the parking assistance device 100 when various types of calculations are performed by the parking assistance device 100. Since various types of publicly-known techniques for setting the target parking position P can be used, description thereof will be omitted. The target parking position P set by the target parking position setting unit 11 is transferred to a later-described inclination calculation unit 13 as target parking position information that includes the above-described coordinates.

The vehicle position information acquisition unit 12 acquires vehicle position information indicating the current position of the vehicle 1 stopped with respect to the target parking position P when parking is to be performed. Here, in the present embodiment, a description is given using parallel parking as an example of parking. If parallel parking is to be performed, the vehicle 1 is temporarily stopped at a predetermined position (e.g., the position shown in FIG. 2) by the driver. There is no particular limitation to this position, and it is set to be in the vicinity of the target parking position P (in particular, rearward to the right in the longitudinal direction of the target parking position P) so that the vehicle length direction ML of the vehicle 1 matches the longitudinal direction PL of the target parking position P. The longitudinal direction PL of the target parking position P is a direction parallel to the long side of the rectangle that defines the target parking position P. For this reason, rearward to the right in the longitudinal direction corresponds to obliquely behind and to the right of the target parking position P in a view from above of the target parking position P.

The vehicle position information acquisition unit 12 acquires vehicle position information indicating the current position of the vehicle 1 that is temporarily stopped obliquely behind and to the right of the target parking position P. The parking position information indicates relative positions obtained using the target parking position P as a reference, and it can be indicated by coordinates obtained using the target parking position P as a reference. Also, information indicating the orientation in which the vehicle length direction ML of the vehicle 1 is facing is included in the vehicle position information. The vehicle position information can be acquired using at least one of a camera, an ultrasonic sonar, a GPS sensor, or the like included in the vehicle 1. Similarly to the above-described target parking position information, the thus-acquired vehicle position information is converted into the coordinate system that is used for the calculation performed by the parking assistance device 100, and is transferred to the inclination calculation unit 13, which will be described below.

The inclination calculation unit 13 calculates the current inclination of the vehicle length direction ML of the vehicle 1 with respect to the target parking position P, based on the vehicle position information. The vehicle position information is transferred from the above-described vehicle position information acquisition unit 12. In the present embodiment, the current inclination of the vehicle length direction ML of the vehicle 1 with respect to the target parking position P is the current inclination of the vehicle length direction ML of the vehicle 1 with respect to the longitudinal direction PL of the target parking position P. The coordinates for the target parking position P that define the longitudinal direction PL of the target parking position P are transferred from the above-described target parking position setting unit 11 as a piece of target parking position information. The current inclination of the longitudinal direction ML of the vehicle 1 with respect to the longitudinal direction PL of the target parking position P refers to the inclination of the vehicle length direction ML with respect to the longitudinal direction PL. That is to say, it corresponds to an angle θ that indicates the difference in angle between the vehicle length direction ML and a line PL' that is parallel to the longitudinal direction PL and has been moved along the outlined arrow shown in FIG. 2. The slope calculation unit 13 calculates the angle θ, which is the difference in angle between the longitudinal direction PL and the vehicle length direction ML. The result of detection performed by the ground object detection unit 13 is transferred to the offset amount setting unit 14, which will be described later.

In the case where the vehicle 1 is to be caused to travel forward from the current position at a predetermined steering angle, the offset amount in the interval direction of the forward route FR between the current position of the vehicle 1 and the position at which the vehicle length direction ML of the vehicle 1 is parallel with the forward route FR is set by the offset amount setting unit 14 based on the inclination. Causing the vehicle 1 to travel forward from the current position at a predetermined steering angle means causing the vehicle 1 to travel forward from its current position indicated by the vehicle position information acquired by the vehicle position information acquisition unit 12, so that the longitudinal direction PL of the target parking position P and the vehicle length direction ML of the vehicle 1 become parallel. Accordingly, the predetermined steering angle is the steering angle according to which, when the vehicle 1 is caused to travel forward, the longitudinal direction PL of the target parking position P and the vehicle length direction ML of the vehicle 1 become parallel.

Figure 3:
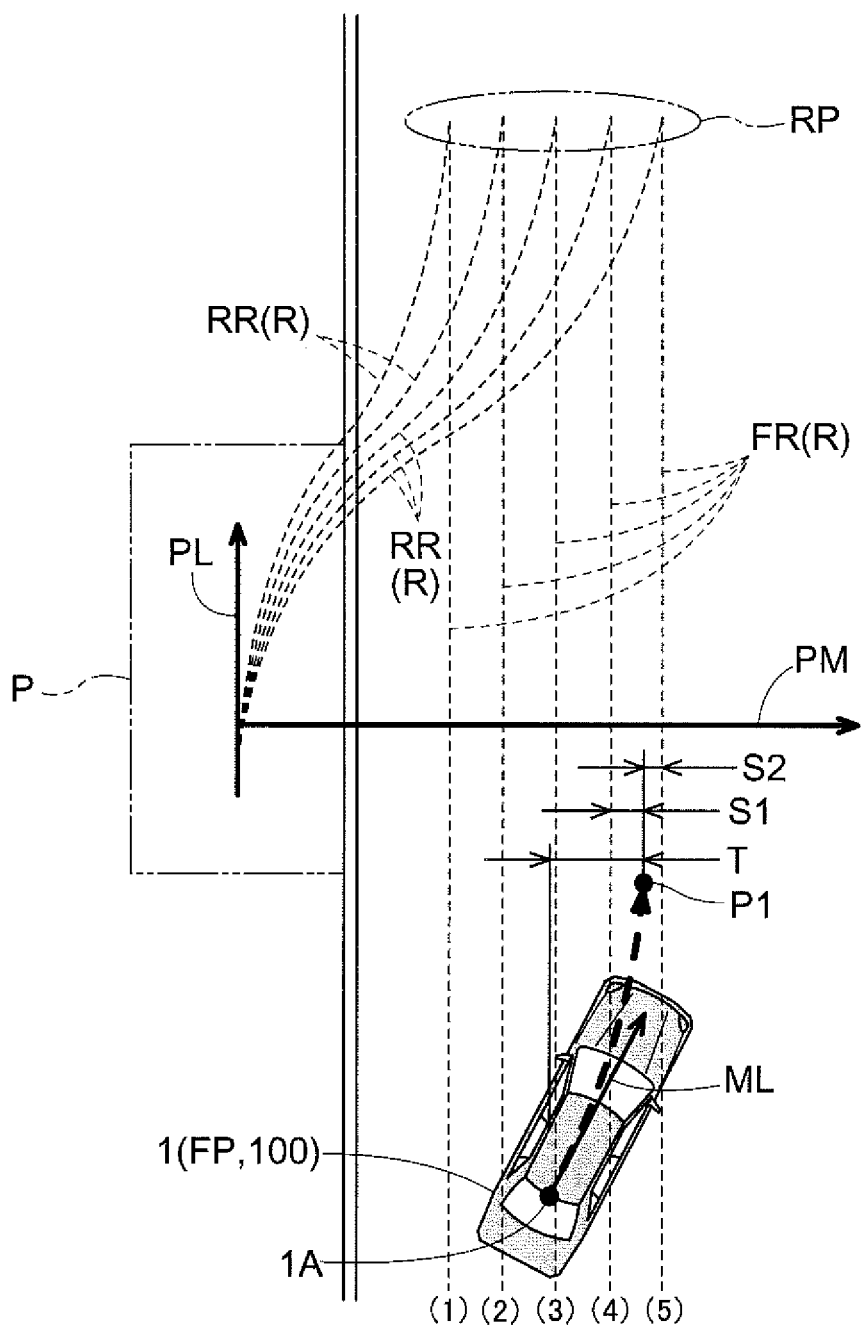
FIG. 3 is a diagram showing an offset amount.

In the present embodiment, the above-described current position of the vehicle 1 and the position at which the vehicle length direction ML of the vehicle 1 is parallel with the forward route FR correspond respectively to the current position of the vehicle 1 and the position at which the vehicle length direction ML of the vehicle 1 is parallel with respect to the longitudinal direction PL of the target parking position P, as shown in FIG. 3. The position at which the vehicle length direction ML of the vehicle 1 is parallel with respect to the longitudinal direction PL of the target parking position P means the position at which the vehicle length direction ML of the vehicle 1 and the longitudinal direction PL of the target parking position P become parallel in the case of traveling at the steering angle. In FIG. 3, it corresponds to the position resulting from the reference position 1A of the vehicle 1 moving from the forward start position FP to the position denoted by reference numeral P1. Hereinafter, a description will be given taking the position at which the vehicle width direction ML of the vehicle 1 and the longitudinal direction PL of the target parking position P are parallel as parallel position P1.

Here, as will be described in detail later multiple forward routes FR are provided at a predetermined interval. A straight forward route on which the vehicle 1 proceeds directly is included among the forward routes FR. The interval direction of the forward routes FR is the direction extending along the intervals between the straight forward routes among the forward routes FR. In other words, it refers to the direction perpendicular to the straight forward route. In the present embodiment, if the vehicle 1 is to be caused to travel forward from the current position at a predetermined steering angle, the offset amount setting unit 14 sets an offset amount in the width direction PM perpendicular to the longitudinal direction PL of the target parking position P between the current position of the vehicle 1 and the position at which the vehicle length direction ML of the vehicle 1 is parallel with respect to the longitudinal direction PL of the target parking position P, based on the inclination. The width direction PM that is perpendicular to the longitudinal direction PL of the target parking position P refers to the direction along the width direction of the road L that is perpendicular to the longitudinal direction PL of the target parking position P. Accordingly, the above-described offset amount in the width direction PM of the target parking position P between the parallel position P1 and the current position of the vehicle 1 corresponds to a deviation T in the width direction PM between the current position of the vehicle 1 and the parallel position P1. The offset amount setting unit 14 calculates the deviation T based on the inclination (the above-described angle θ) obtained by the inclination calculation unit 13.

Figures 4, 5:
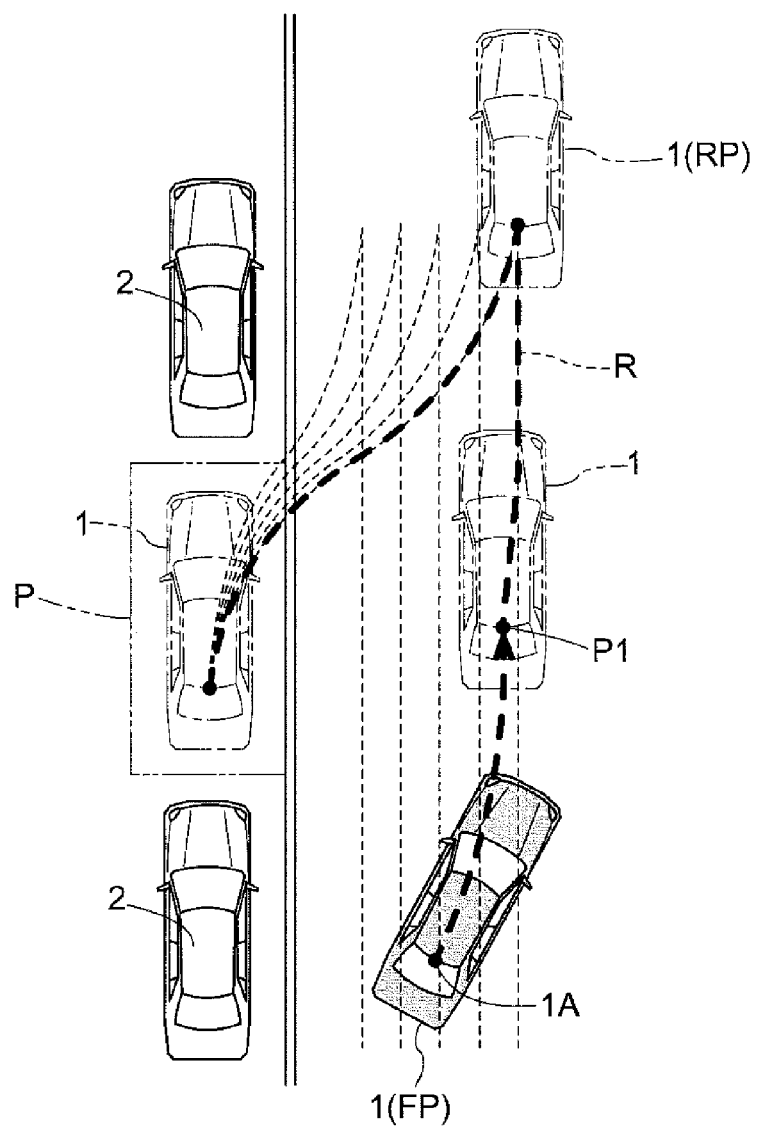
FIG. 4 is a table showing offset amounts with respect to an inclination of a vehicle.
FIG. 5 is a diagram showing a travel route selected by a route information selection unit.

In the present embodiment, a map that defines in advance the relationship between the inclination (the above-described angle θ) of the vehicle 1 and the offset amount (the above-described deviation T) is stored in the offset amount setting unit 14. For this reason, the offset amount setting unit 14 sets the offset amount based on the map. An example of the map is shown in FIG. 4. As shown in FIG. 4, the offset amount is indicated corresponding to the inclination (angle θ) of the vehicle 1.

Here, "a" to "k" in FIG. 4 are actually stored as numerical values indicating respective offset values. In other words, the example in FIG. 4 shows that when the angle θ is "−θ1", it is necessary to move by "a" in the width direction PM in order for the vehicle length direction ML of the vehicle 1 to be parallel with the longitudinal direction PL of the target parking position P. Also, it is shown that when the angle θ is "θ1", it is necessary to move by "k" in the width direction PM in order for the vehicle length direction ML of the vehicle 1 to be parallel with the longitudinal direction PL of the target parking position P. Here, "−θ1" means that the angle of the vehicle length direction ML of the vehicle 1 has been shifted by "θ1" in the counterclockwise direction, and "θ1" means that the angle of the vehicle length direction ML of the vehicle 1 has been shifted by θ1 in the clockwise direction. The offset amount obtained by the offset amount setting unit 14 is transferred to the route information selection unit 16, which will be described later.

The route information storage unit 15 stores in advance multiple pieces of route information indicating a travel route R composed of a forward route FR for traveling forward from the forward start position FP to the reverse start position RP and a reverse route RR for traveling in reverse from the reverse start position RP to the target parking position P at the time of parking the vehicle 1 in the target parking position P as shown in FIG. 3 while operating the steering angle, the multiple pieces of route information being stored corresponding to the forward start position FP. Here, in general, when performing parallel parking, the vehicle 1 travels forward toward a predetermined position to the right and front of the target parking position P, and then travels in reverse from the predetermined position toward the target parking position P. The predetermined position corresponds to the above-described reverse start position RP.

In the present embodiment, when performing parallel parking in the target parking position P, forward traveling is performed parallel along the longitudinal direction PL of the target parking position P, and then reverse traveling is performed while operating the steering angle so as to turn. The travel routes R at the time of performing parallel parking are composed of the forward route FR for traveling forward and the reverse route RR for traveling in reverse, and the travel routes R are handled as route information that includes the coordinates defined using the forward start position FP as a reference. The route information is stored in advance in the route information storage unit 15 for each forward start position FP. In the present embodiment, as indicated by reference numerals (1) to (5) in FIG. 3, multiple pieces of route information indicating travel routes R that are shifted in the width direction PM by a predetermined interval are stored in the route information storage unit 15. Note that in FIG. 3, five travel routes R, namely (1) to (5) are shown, but it is also possible to use a configuration in which the intervals between the respective travel routes R are shortened and 6 or more travel routes are present, and a configuration using 4 or less is also possible.

The route information selection unit 16 selects, from among the pieces of route information stored in the route information storage unit 15, one piece of route information indicating a travel route R that is adjacent to the position at which the vehicle length direction ML is parallel with the forward route FR. The position at which the vehicle length direction ML is parallel with the forward route FR is a position offset from the current position of the vehicle 1 in the width direction PM by the offset amount calculated by the offset amount setting unit 14 (referred to below as "offset position"). Here, since the offset position is the same position as the above-described parallel position P1, a description will be given below with the reference numeral P1 added to the offset position as well. The travel routes R that are adjacent to the position at which the vehicle length direction ML is parallel refers to the travel route R that is adjacent on the near side relative to the offset position P1 in a view of the offset position P1 from the target parking position P in the width direction M, and the travel route R adjacent on the distant side relative to the offset position P1 in a view of the offset position P1 in the width direction PM. The travel route R adjacent on the near side relative to the offset position P1 is the travel route R adjacent on the closer side relative to the offset position P1, and in FIG. 3, it corresponds to the travel route R denoted by the reference numeral (4). Also, the travel route R adjacent on the distant side relative to the offset position P1 is the travel route R adjacent on the farther side relative to the offset position P1, and in FIG. 3, it corresponds to the travel route R denoted by the reference numeral (5). The route information selection unit 16 selects one of the pieces of route information indicating these kinds of travel routes R.

In the present embodiment, from among the pieces of route information indicating the travel routes R that are adjacent to the position at which the vehicle length direction ML is parallel with the forward route FR, the route information selection unit 16 selects a piece of route information indicating the travel route R that is closer in the interval direction of the forward route FR to the position at which the vehicle length direction ML is parallel with the forward route FR. In other words, among the two travel routes (4) and (5) that are located on the near side and the distant side relative to the offset position P1 in a view of the offset position P1 from the target parking position P in the width direction PM, the route information selection unit 16 selects the piece of route information indicating the travel route (5) that is closer to the offset position P1 in the width direction PM. In other words, the travel route (5) with a deviation S2, which is the smaller of a deviation S1 in the width direction PM between the travel route (4) and the offset position P1, and the deviation S2 in the width direction between the travel route (5) and the offset position P1, is selected.

Accordingly, as shown in FIG. 5, it is possible to set a travel route R that is a smooth travel route from the forward start position FP to the reverse start position RP via the offset position P1. Accordingly, if the vehicle 1 is caused to travel forward from the forward start position FP to the reverse start position RP, the steering operation is performed smoothly, and therefore it is possible to prevent the driver of the vehicle 1 from having a feeling of discomfort.

Here, if there is one piece of route information that indicates a travel route R adjacent to the position at which the vehicle length direction ML is parallel with the forward route FR, the route information selection unit 16 selects that piece of route information. In other words, if the travel route R is located at only one of the near side and the distant side relative to the offset position P1 in a view of the offset position P1 from the target parking position P in the width direction PM, the route information selection unit 16 selects the piece of route information indicating the one travel route R. Accordingly, even if the travel route R is located only on the near side relative to the travel route R stored in advance in the route information storage unit 15 in a view from the current position of the vehicle 1 in the width direction PM, it is possible to select the travel route R.

The guiding unit 17 guides the vehicle 1 to the target parking position P based on the selected route information. The selected route information is the route information indicating the travel route R selected by the route information selection unit 16. The guiding unit 17 guides the vehicle 1 to the target parking position P based on the route information. Accordingly, as shown in FIG. 5, it is possible to move the vehicle 1 from the reverse start position RP to the target parking position P. Regarding the guidance performed by the guiding unit 17, guidance may be performed according to automatic travel by controlling steering and a travel mechanism, and guidance may be performed by speech or by performing display on a monitor that is also used as the above-described touch panel. According to this, the parking assistance device 100 assists the driver of the vehicle 1 in performing parallel parking.

Figure 6:
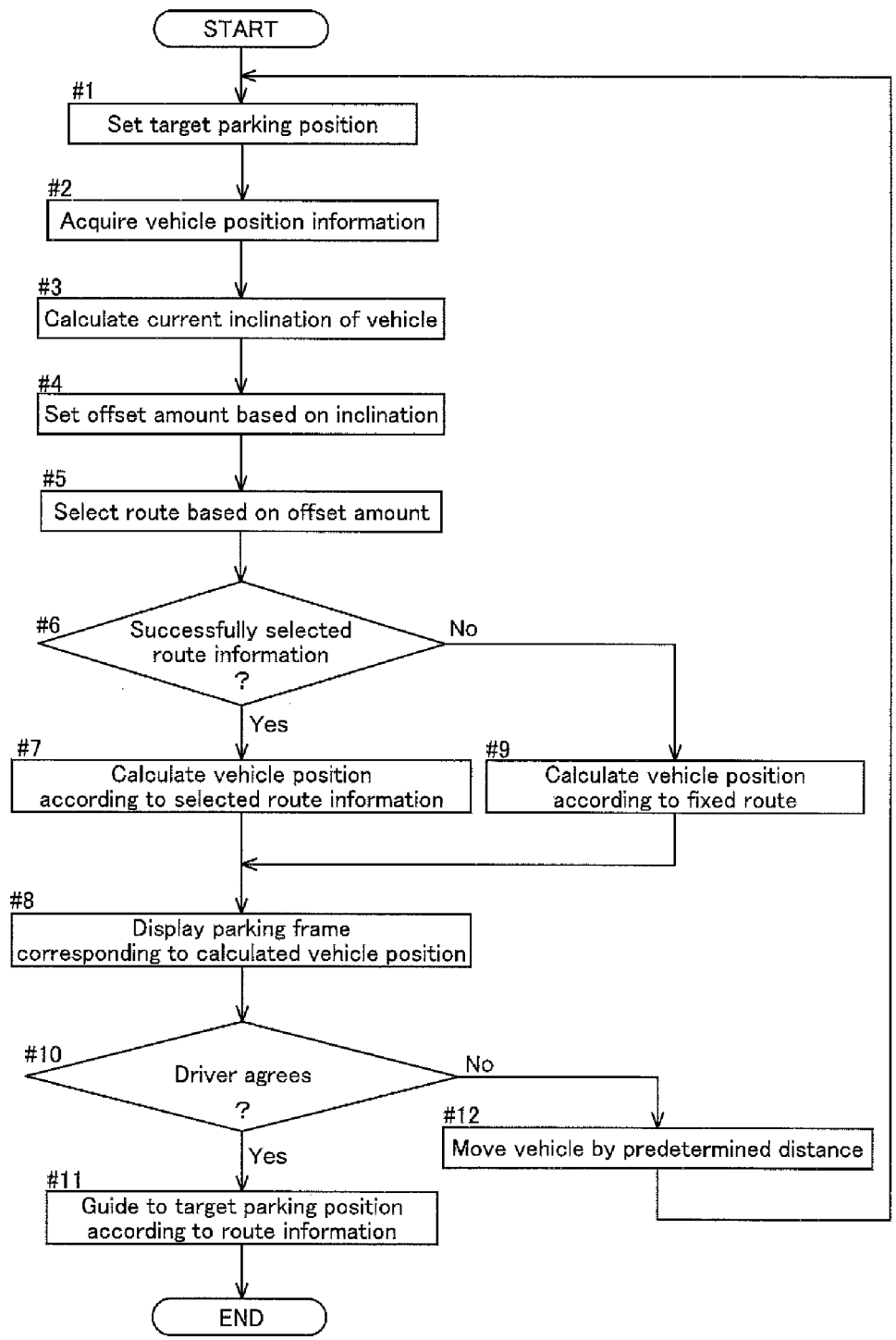
FIG. 6 is flowchart showing processing performed by a parking assistance device.

Next, processing for driving assistance of parallel parking performed by the parking assistance device 100 will be described with reference to the flowchart in FIG. 6. First, the target parking position P is set to be the vicinity of the vehicle 1 by the target parking position setting unit 11 (step #1). Meanwhile, the vehicle position information indicating the current position of the vehicle 1 that is stopped in order to perform parallel parking is acquired by the vehicle position information acquisition unit 12 (step #2). The target parking position information indicating the target parking position P set by the target parking position setting unit 11 and the vehicle position information acquired by the vehicle position information acquisition unit 12 are used by the inclination calculation unit 13 to calculate the current inclination of the vehicle length direction ML of the vehicle 1 with respect to the longitudinal direction PL of the target parking position P (step #3).

The offset amount setting unit 14 sets an offset amount corresponding to the travel distance needed for the current vehicle length direction ML of the vehicle 1 to become parallel with the longitudinal direction PL of the target parking position P, based on the inclination obtained by the inclination calculation unit 13 (step #4). Among the pieces of route information stored in the route information storage unit 15, the route information selection unit 16 searches for the piece of route information indicating the travel route R corresponding to the offset amount and selects it (step #5).

If the route information is selected (Yes in step #6), the guiding unit 17 calculates the vehicle position corresponding to the selected route information (step #7). In other words, coordinates corresponding to the current position of the vehicle 1 (vehicle) on the travel route R indicated by the selected route information are calculated. Furthermore, the guiding unit 17 displays a parking frame corresponding to the calculated vehicle position (step #8). That is to say, the parking frame is displayed at the position corresponding to the target parking position P that was set by the target parking position setting unit 11.

On the other hand, if route information is not selected in step #6 (No in step #6), the guiding unit 17 calculates the vehicle position corresponding to the route information indicating a default fixed route that has been set in advance (step #9), and displays the parking frame at a position corresponding to the target parking position P set by the target parking position setting unit 11 (step #8).

If the driver agrees to the thus-displayed parking frame (Yes in step #10), the guiding unit 17 guides the vehicle 1 to the target parking position P according to the route information (step #11), and when the vehicle 1 reaches the target parking position P, the processing ends. On the other hand, if the driver does not agree to the displayed parking frame in step #10 (No in step #10), the driver is prompted to move the vehicle, and if the vehicle 1 is moved by a predetermined distance (step #12), the processing is performed from step #1. Note that it is possible to determine whether or not the driver agrees to the displayed parking frame in step #10 by displaying an operation switch icon on the touch panel or the like and determining whether or not the operation switch icon has been pressed.

Alternative Embodiments

In the above embodiment, the drawings indicated that the target parking position P in which the vehicle 1 is to be parked is located on the left side of the road L. However, the parking assistance device 100 of this disclosure is not limited to this. The parking assistance device 100 of this disclosure can be applied also in the case where the target parking position P in which the vehicle 1 is to be parked is located on the right side of the road L. In such a case, it is preferable that the route information indicating the travel route R for guiding the vehicle 1 to the target parking position P located on the right side of the road L is stored in the route information storage unit 15.

In the present embodiment, a description was given in which the offset amount setting unit 14 sets the offset amount based on the map in which the relationship between the inclination of the vehicle 1 and the offset amount are defined in advance. However, the parking assistance device 100 of this disclosure is not limited to this. The offset amount setting unit 14 can also be made to learn the offset amount every time using a publicly-known learning function and set the offset amount based on the learned offset amount without using the map.

In the present embodiment, a description was given in which, from among the pieces of route information indicating travel routes R that are adjacent to the position at which the vehicle length direction ML is parallel with the forward route FR, the route information selection unit 16 selects a piece of route information indicating the travel route R that is closer in the interval direction of the forward route FR to the position at which the vehicle length direction ML is parallel with the forward route FR. However, the parking assistance device 100 of this disclosure is not limited to this. For example, it is possible for the route information selection unit 16 to be configured to, from among the pieces of route information indicating the travel routes R that are adjacent to the position at which the vehicle length direction ML is parallel with the forward route FR, select the piece of route information indicating the travel route R that is farther away from the target parking position P in the interval direction of the forward route FR. That is to say, the route information selection unit 16 can also be configured to, from among the pieces of route information indicating the travel routes R adjacent to the offset position, select the piece of route information indicating the travel route R that is more distant in a view of the offset position P1 in the width direction PM. In such a case, since it is possible to prevent overshooting with respect to the travel route R at the time when the vehicle 1 travels toward the selected travel route R, it is possible to prevent the driver from feeling discomfort.

In the above-described embodiment, a description was given in which, if there is one piece of route information showing a travel route R adjacent to the position at which the vehicle length direction ML is parallel with the forward route FR, the route information selection unit 16 selects the piece of route information. However, the parking assistance device 100 of this disclosure is not limited to this. The route information selection unit 16 can also be configured to select a piece of route information indicating a pre-set fixed route if there is one piece of route information indicating a travel route R adjacent to the position at which the vehicle length direction ML is parallel with the forward route FR. The route information selection unit 16 can also be configured to, in the case where there is one piece of route information indicating a travel route R adjacent to the position at which the vehicle length direction ML is parallel with the forward route FR, select the travel route R indicated by the route information if the distance in the width direction between the offset position P1 and the travel route R indicated by the route information is less than the pre-set distance, and select the route information indicating the pre-set fixed route if the distance in the width direction between the offset position P1 and the travel route R indicated by the route information is greater than or equal the pre-set distance.

In the present embodiment, a description was given using parallel parking as an example of parking. However, the parking assistance device 100 of this disclosure is not limited to this. It is natural that the parking assistance device 100 according to this disclosure can also be applied to garage parking (perpendicular parking).

In the case where the parking assistance device 100 specializes in a function of performing driving assistance for parallel parking of the vehicle 1, the characteristic configuration of the parking assistance device 100 can be expressed as follows.

The parking assistance device 100 includes: a route information storage unit 15 storing in advance route information indicating a travel route R composed of a forward route FR for traveling forward parallel with respect to a longitudinal direction PL of a target parking position P from a forward start position FP to a reverse start position RP, and a reverse route RR for traveling in reverse while operating a steering angle from the reverse start position RP to the target parking position P at the time of performing parallel parking of the vehicle 1 in the target parking position P, the route information being stored according to the forward start position FP; a vehicle position information acquisition unit 12 that acquires vehicle position information indicating the current position of the vehicle 1 that has stopped with respect to a target parking position P when parallel parking is to be performed; an inclination calculation unit 13 configured to calculate a current inclination of a vehicle length direction ML of the vehicle 1 with respect to the longitudinal direction PL of the target parking position P based on the vehicle position information; an offset amount setting unit 14 configured to, if the vehicle 1 is to be caused to travel forward at a predetermined steering angle from its current position, set an offset amount in a width direction PM that is perpendicular to the longitudinal direction PL of the target parking position P between the current position of the vehicle 1 and the position at which the vehicle length direction ML of the vehicle 1 is parallel with respect to the longitudinal direction PL of the target parking position P, based on the inclination; a route information selection unit 16 configured to, out of the pieces of route information stored in the route information storage unit 15, select one piece of route information indicating a travel route R adjacent to the position at which the vehicle length direction ML will be parallel; and a guiding unit 17 configured to guide the vehicle 1 to the target parking position P based on the selected piece of route information.

With this kind of configuration, it is possible to cause forward traveling on a smooth traveling route R from the position of the vehicle 1 that has stopped with respect to the target parking position P to the reverse start position RP. Also, it is sufficient to travel in reverse from this kind of reverse start position RP to the target parking position P in accordance with a reverse route RR that is stored in advance. Accordingly, since it is possible to cause the vehicle 1 to travel in a smooth manner, it is possible to prevent the driver from feeling discomfort when the vehicle 1 is to be parallel parked.

This disclosure can be used for a parking assistance device configured to set a travel route to a target parking position according to the inclination of a vehicle with respect to the target parking position.

What is claimed is:
1. A parking assistance device comprising:
a target parking position setting unit setting a target parking position which is a parking space in which a vehicle is to be parked;
a route information storage unit storing in advance a plurality of pieces of route information indicating a travel route composed of a forward route for traveling forward from a forward start position to a reverse start position and a reverse route for traveling in reverse from the reverse start position to the target parking position when parking of the vehicle in the target parking position is to be performed while a steering angle operation is performed, the plurality of pieces of route information being stored according to the forward start position;
a vehicle position information acquisition unit configured to acquire vehicle position information indicating a current position of the vehicle that has stopped with respect to the target parking position when the parking is to be performed;
an inclination calculation unit configured to calculate a current inclination of the vehicle in the vehicle length direction with respect to the target parking position based on the vehicle position information;
an offset amount setting unit configured to, in the case where a plurality of forward routes are provided at a predetermined interval and the vehicle is to be caused to travel forward from the current position at a predetermined steering angle, set an offset amount in the interval direction of the forward route between the current position of the vehicle and a position at which the vehicle length direction of the vehicle is parallel with the forward route, based on the inclination;
a route information selection unit configured to, among the plurality of pieces of route information stored in the route information storage unit, select a piece of route information indicating a travel route adjacent to the position at which the vehicle length direction is parallel with the forward route; and
a guiding unit configured to guide the vehicle, forward and then in reverse, from the current position to the target parking position based on the selected route information.

2. The parking assistance device according to claim 1, wherein
the offset amount setting unit sets the offset amount based on a map in which the relationship between the inclination of the vehicle and the offset amount is defined in advance.

3. The parking assistance device according to claim 2, wherein
from among pieces of route information indicating travel routes adjacent to the position at which the vehicle length direction is parallel with the forward route, the route information selection unit selects a piece of route information indicating a travel route that is closer in the interval direction to the position at which the vehicle length direction is parallel with the forward route.

4. The parking assistance device according to claim 3, wherein
in the case where there is one piece of route information indicating a travel route adjacent to the position at which the vehicle length direction is parallel with the forward route, the route information selection unit selects the piece of route information.

5. The parking assistance device according to claim 2, wherein
from among pieces of route information indicating travel routes adjacent to the position at which the vehicle length direction is parallel with the forward route, the route information selection unit selects a piece of route information indicating a travel route that is farther away in the interval direction from the target parking position.

6. The parking assistance device according to claim 5, wherein
in the case where there is one piece of route information indicating a travel route adjacent to the position at which the vehicle length direction is parallel with the forward route, the route information selection unit selects the piece of route information.

7. The parking assistance device according to claim 2, wherein
in the case where there is one piece of route information indicating a travel route adjacent to the position at which the vehicle length direction is parallel with the forward route, the route information selection unit selects the piece of route information.

8. The parking assistance device according to claim 1, wherein
from among pieces of route information indicating travel routes adjacent to the position at which the vehicle length direction is parallel with the forward route, the route information selection unit selects a piece of route information indicating a travel route that is closer in the interval direction to the position at which the vehicle length direction is parallel with the forward route.

9. The parking assistance device according to claim 8, wherein
in the case where there is one piece of route information indicating a travel route adjacent to the position at which the vehicle length direction is parallel with the forward route, the route information selection unit selects the piece of route information.

10. The parking assistance device according to claim 1, wherein
from among pieces of route information indicating travel routes adjacent to the position at which the vehicle length direction is parallel with the forward route, the route information selection unit selects a piece of route information indicating a travel route that is farther away in the interval direction from the target parking position.

11. The parking assistance device according to claim 10, wherein
in the case where there is one piece of route information indicating a travel route adjacent to the position at which the vehicle length direction is parallel with the forward route, the route information selection unit selects the piece of route information.

12. The parking assistance device according to claim 1, wherein
in the case where there is one piece of route information indicating a travel route adjacent to the position at which the vehicle length direction is parallel with the forward route, the route information selection unit selects the piece of route information.

13. A parking assistance device comprising:
a route information storage unit storing in advance a plurality of pieces of route information indicating a travel route composed of a forward route for traveling forward from a forward start position to a reverse start position and a reverse route for traveling in reverse from the reverse start position to a target parking position when parking of a vehicle in the target parking position is to be performed while a steering angle operation is performed, the plurality of pieces of route information being stored according to the forward start position;
a vehicle position information acquisition unit configured to acquire vehicle position information indicating a current position of the vehicle that has stopped with respect to the target parking position when the parking is to be performed;
an inclination calculation unit configured to calculate a current inclination of the vehicle in the vehicle length direction with respect to the target parking position based on the vehicle position information;
an offset amount setting unit configured to, in the case where a plurality of forward routes are provided at a predetermined interval and the vehicle is to be caused to travel forward from the current position at a predetermined steering angle, set an offset amount in the interval direction of the forward route between the current position of the vehicle and a position at which the vehicle length direction of the vehicle is parallel with the forward route, based on the current inclination of the vehicle calculated by the inclination calculation unit;
a route information selection unit configured to, among the plurality of pieces of route information stored in the route information storage unit, select a piece of route information indicating a travel route adjacent to the position at which the vehicle length direction is parallel with the forward route; and
a guiding unit configured to guide the vehicle, forward and then in reverse, from the current position to the target parking position based on the selected route information.

* * * * *